(12) United States Patent
Straatsma

(10) Patent No.: US 12,004,646 B2
(45) Date of Patent: Jun. 11, 2024

(54) GOODS STORAGE RACK

(71) Applicant: NEDCON B.V., Doetinchem (NL)

(72) Inventor: Erwin Straatsma, Wehl (NL)

(73) Assignee: NEDCON B.V., Doetinchem (NL)

( * ) Notice: Subject to any disclaimer, the term of this patent is extended or adjusted under 35 U.S.C. 154(b) by 0 days.

(21) Appl. No.: 18/023,751

(22) PCT Filed: Aug. 25, 2021

(86) PCT No.: PCT/EP2021/073448
§ 371 (c)(1),
(2) Date: Feb. 28, 2023

(87) PCT Pub. No.: WO2022/048958
PCT Pub. Date: Mar. 10, 2022

(65) Prior Publication Data
US 2023/0218083 A1    Jul. 13, 2023

(30) Foreign Application Priority Data
Sep. 1, 2020  (DE) ............ 10 2020 122 840.6

(51) Int. Cl.
*A47B 96/02*  (2006.01)
*A47B 47/00*  (2006.01)
*A47B 47/02*  (2006.01)

(52) U.S. Cl.
CPC ........ *A47B 96/021* (2013.01); *A47B 47/0083* (2013.01); *A47B 47/028* (2013.01); *A47B 47/00* (2013.01); *A47B 47/021* (2013.01)

(58) Field of Classification Search
CPC ....... A47B 96/021; A47B 57/20; A47B 57/06; A47B 57/40; A47B 57/487; A47B 57/402;
(Continued)

(56) References Cited

U.S. PATENT DOCUMENTS 2,918,176 A * 12/1959 Bell ............... A47B 47/027
   211/187
3,285,428 A * 11/1966 Scheck ............ A47B 57/06
   52/666
(Continued)

FOREIGN PATENT DOCUMENTS

DE    602005000018      1/2007
DE    102010038968 A1   12/2011
(Continued)

*Primary Examiner* — Devin K Barnett
(74) *Attorney, Agent, or Firm* — Smartpat PLC

(57) ABSTRACT

A rack for storing goods has supports which extend between crossbeams. The supports are downwardly open profiles having a first and a second side wall. A horizontal wall connects the side walls and forms a goods support. At least one crossbeam has two slots, each with a locking projection that engages in an opening in the respective side wall. The openings are located in short end portions of the side walls. Central portions form a majority length of the side walls. The end portions are separated from the central portions by a slot which extends from the lower edge of the side wall over a portion of the height of the side wall. The end portions have in the direction toward the lower edge thereof a wall extent which in comparison with the wall extent on the central portion is offset in the direction toward the profile center plane.

19 Claims, 5 Drawing Sheets

(58) Field of Classification Search
CPC ....... A47B 57/50; A47B 57/00; A47B 47/021; A47B 47/0083; A47B 47/02; A47B 47/00; A47B 47/027; A47B 47/028
See application file for complete search history.

(56) References Cited

U.S. PATENT DOCUMENTS

| | | | | |
|---|---|---|---|---|
| 4,078,664 | A * | 3/1978 | McConnell | A47B 96/00 211/187 |
| 4,665,838 | A * | 5/1987 | Minshall | A47B 47/021 211/186 |
| 4,955,490 | A * | 9/1990 | Schafer | A47B 96/02 211/187 |
| 5,628,415 | A * | 5/1997 | Mulholland | A47B 47/027 211/186 |
| 5,806,820 | A * | 9/1998 | Simon | H02G 3/263 248/222.52 |
| 5,845,795 | A * | 12/1998 | Mulholland | A47B 47/027 248/221.12 |
| 6,039,192 | A * | 3/2000 | Hollander | A47B 96/021 211/186 |
| 6,105,798 | A * | 8/2000 | Gruber | B65G 1/02 211/151 |
| 7,614,511 | B2 * | 11/2009 | Konstant | A47B 47/028 211/192 |
| D683,983 | S * | 6/2013 | Troyner | D6/675.2 |
| 10,299,594 | B2 * | 5/2019 | Liss | A47B 47/027 |
| 10,806,257 | B1 * | 10/2020 | Liu | A47B 47/024 |
| 11,026,509 | B2 * | 6/2021 | Walker | A47B 47/0083 |
| 11,390,460 | B2 * | 7/2022 | Lellimo | A47B 96/021 |
| 11,602,221 | B1 * | 3/2023 | Beck | A47B 96/14 |
| 2012/0000871 | A1 * | 1/2012 | Troyner | A47B 47/021 211/134 |
| 2012/0067838 | A1 * | 3/2012 | Lawson | A47B 47/024 211/183 |
| 2013/0098856 | A1 * | 4/2013 | Troyner | A47B 47/0083 211/183 |
| 2014/0116973 | A1 * | 5/2014 | Buckley | A47F 5/00 29/525.01 |
| 2015/0076090 | A1 * | 3/2015 | Heijmink | A47B 57/402 211/49.1 |
| 2015/0090683 | A1 * | 4/2015 | Sabounjian | A47B 96/14 211/186 |
| 2015/0359330 | A1 * | 12/2015 | Offerman | A47B 47/03 211/186 |
| 2015/0359335 | A1 * | 12/2015 | Offerman | A47B 96/02 211/153 |
| 2018/0066691 | A1 * | 3/2018 | Matsumoto | H05K 7/18 |
| 2023/0270248 | A1 * | 8/2023 | Hanlon | A47B 47/0083 211/187 |

FOREIGN PATENT DOCUMENTS

| | | |
|---|---|---|
| DE | 112016002098 | 3/2018 |
| EP | 0882660 A1 | 12/1998 |
| EP | 2324732 A1 | 5/2011 |
| EP | 2468138 A1 | 6/2012 |
| JP | 2000289817 A | 10/2000 |
| JP | 2013049494 A | 3/2013 |
| WO | 2010022448 A1 | 3/2010 |

* cited by examiner

GOODS STORAGE RACK

TECHNICAL FIELD

The disclosure relates to a goods storage rack.

BACKGROUND

A rack is known from DE 10 2010 038 968 A1 and is used mainly in large rack warehouses having autonomously controlled storage and removal of unit goods. The unit goods are, for example, boxes or standardized containers, such as, for example, small containers. In order to store unit goods, the rack is subdivided into a large number of support faces which are arranged one above the other and beside each other, wherein the supports with the elongate support faces have such a depth that a plurality of unit goods can also be stored in a state staggered one behind the other in each compartment. In order to enable a displacement of the unit goods into and out of the rack during storage and removal, a support which extends in the direction of the rack depth, which is without steps as far as possible and which is also referred to as a depth support is required.

In most cases, the supports are mounted in pairs, wherein they are supported in each case with one end thereof on a front crossbeam and with the other end thereof on a rear crossbeam. The fixing is carried out by means of locking. To this end, the supports are pressed together at the side walls thereof and at the same time under considerable pressure pressed from above into the slots of the crossbeam. To this end, considerable forces are required since the profile which forms the support is relatively stable in terms of deformation and is additionally reinforced by means of folds by means of which the profile is reinforced along the lower edges thereof. Since considerable forces have to be applied for the deformation and assembly of the support, the assembly complexity with the rack according to DE 10 2010 038 968 A1 is high on the whole.

A rack for storage and picking purposes according to EP 0 882 660 B1 is composed of a system of vertical pillars to which horizontal crossbeams are secured in accordance with the individual compartment heights. The crossbeams are also in this instance configured to provide grip for supports which extend through the depth of the rack. The supports are constructed in such a manner that they provide a support face for two mutually adjacent load carriers, wherein they additionally provide a longitudinal guide in the rack for them so that contact of adjacent load carriers is excluded. In order to be able to provide both a support face for two load carriers and to separate them from each other, the support is constructed with two parallel goods supports. On the support a chamfer which is orientated relative to the crossbeam is formed at the ends of the goods supports in order to reduce the resistance for the unit goods when moving from the crossbeam to the goods support. The entire support is in one piece and can be engaged on the crossbeam.

Another generic rack for goods storage is described in WO 2010/022448 A1.

SUMMARY

An object of the disclosure is to provide a rack for goods storage in which the assembly complexity is less in comparison with rack systems having a comparable load-bearing capacity.

The rack includes two crossbeams which are arranged parallel with each other and supports which extend between the crossbeams and which are supported thereon. The supports are in the form of profiles which are open in a downward direction and are composed in each case of a first side wall at one side of a vertical profile center plane and a second side wall at the other side of a vertical profile center plane and a horizontal wall which connects the side walls. The upper side of the horizontal wall forms the goods support. The crossbeam has a crossbeam upper side, a crossbeam rear wall and, in order to secure the respective support, two slots which extend from the crossbeam upper side up to the crossbeam rear wall and which at that location have a locking projection which in the locking state engages in a positive-locking manner in an opening in the respective side wall. The openings are located in each case in end portions of the side walls. These end portions are short in comparison with the central portions which form the largest portion of the length of the side walls.

In order to reduce assembly complexity, the end portions of the side walls are each separated from the central portions by means of a slot which extends, from the lower edge of the side wall, over only a portion of the height of the side wall and that the end portions have in the direction toward the lower edge thereof a wall extent which in comparison with the wall extent on the central portion is offset in the direction toward the profile center plane.

The rack so requires little assembly effort. The fixing of the supports is carried out by means of simple clip-fitting. On the one hand, the slots on the crossbeam and, on the other hand, the end portions, which engage in the slots, of the side walls of the supports are used for this. The support can be locked to the crossbeam with little application of force. Generally, a slight pressure from above onto the respective end of the support will already be sufficient to engage and thereby to lock this end of the support to the respective crossbeam in a secure and durable manner. An additional pressing together of the two side walls so that they are bent toward each other is not required. Instead, as a result of the configuration of the end portions of the two side walls, simply applying pressure from above to the support will already be sufficient to engage the respective end of the support with the respective crossbeam in a secure and durable manner.

Securing steps such as screwing the components to each other or fitting rivets are not required so that significantly reduced assembly times are achieved. When the rack is assembled, it is sufficient to install a movable lifting platform in front of the rack in order to then enable fitters to place all goods supports from the lifting platform in the rack and to engage them not only with the crossbeam at the rack front side, but also at the other, rear crossbeam by simply pressing down vertically, and thus to fix them. An additional pressing-together of the two side walls of the support is not necessary in this instance. In addition, as a result of the engagement which can be clearly heard, it is ensured that the fixing is achieved in a reliable manner, and the assembly has not been carried out, for instance, in an intermediate stage.

The slots which extend from the crossbeam upper side into the crossbeam rear wall are arranged in pairs, wherein the slots taper in a slightly conical manner on the crossbeam rear wall. At mid-height of the slots, locking projections are formed in the slots, wherein the locking projections are formed in the direction toward each other in each case. If the respective end portion is now lowered from above into the respective slot, the configuration of the slot and the locking projections ensures that the end portions are resiliently pressed together. From a specific lowering into the slots, the support is then positioned in such a manner with respect to the crossbeam that the locking projections engage in the openings formed on the end portions. The end portion which was previously bent resiliently inward relaxes, whereby a permanent positive-locking connection is produced between the locking element and the opening.

The locking projections on the crossbeam and the openings on the support are constructed in such a manner with respect to each other that the goods support and the surface of the crossbeam upper side are located at the same vertical level and are in alignment with each other. Consequently, a displacement of the unit goods on the support is enabled without becoming jammed or caught.

For an assembly with little application of force, the vertical slot between the end portion and the central portion is advantageous. This slot leads to a particularly easy deformability of the end portion during assembly.

The supports can be produced as different structural types. With a first structural type, the support which is in the form of a profile is configured in the same manner in each case at the two end regions thereof. Such a support serves to store and remove goods both from one side of the rack and from the other side of the rack. In this instance, push-through protection means are advantageous, for example, in the center of the length of the goods supports. In order to secure the push-through protection means, a securing structure may be formed on the horizontal wall of the support, for example, an opening in the horizontal wall for inserting the push-through protection means therein.

In the case of a second structural type of the support, it is configured differently at both end regions thereof. The goods storage is carried out only from one rack side. At the other rack side, stops or stop elements which are arranged at that location may ensure that goods or bundles of goods only reach this location and go no further.

In the case of a third structural type of the support, it is provided along the horizontal face thereof which acts as a goods support with an upwardly projecting edge in the form of a rib which also extends over the entire length of the support. The edge serves to position the stored goods in a lateral direction and to prevent sliding of the goods.

In order to enable the clip-fitting of the support to the crossbeam by applying only little vertical pressure, it is advantageous for the wall extent on the end portions to be increasingly offset further in a downward direction in the direction toward the profile center plane, for example, in individual steps.

It is not necessary for the end portion of the side wall to be resiliently deformed over the entire height thereof to the same extent. It is therefore proposed that the end portions be composed of two regions. The upper region of each end portion forms a wall portion which is arranged at right-angles with respect to the horizontal wall and which is in alignment with the central portion of the side wall. In contrast, the lower region of the end portion is formed by the wall extent which is offset in an inward direction, that is to say, toward the profile center plane.

An important aspect for the low-resistance resilient and reversible deformation is the slot which is provided in the side wall. It is proposed that the slot extends as far as the height of the wall portion which is in alignment with the central portion and which forms the upper region of the end portion of the side wall. In this manner, at least via the height of the slot, a high degree of resilient deformability is achieved, including a complete resilient recovery behavior.

Another significant aspect is an advantageous positioning of the openings which are provided in the two end portions of the side wall. To this end, it is proposed that the opening at least for the most part thereof is located in the wall extent which is offset in the direction toward the profile center plane and extend upward into the wall portion which is in alignment with the central portion of the side wall.

With regard to the configuration of the wall extent which is offset in the direction toward the profile center plane, it is proposed that it is composed in a step-like manner from a sequence of wall portions which are arranged one above the other and which merge into each other along folding or bending lines. They may, for example, be three wall portions which are arranged one above the other, wherein the upper wall portion preferably extends in an oblique manner and also the lowest wall portion. The central wall portion which is arranged therebetween preferably extends perpendicularly or substantially perpendicularly.

It is further proposed that the opening which is used for engagement extends at least over the entire height of the uppermost wall portion of the wall portions which are arranged one above the other.

The supports which are described in this instance are, for example, mounted in a high rack store in significant unit numbers. The compact transport of the supports to the place of use is correspondingly important. In this instance, it has been found to be advantageous to be able to place two supports one inside the other in each case in such a manner that the profile openings thereof face each other. So that this is carried out with minimal volume, it is proposed that, on the end portion, the lower edge, starting from the vertical slot, initially extends horizontally and then so as to rise toward the end thereof. This partial chamfering of the lower edge corresponds to a chamfer with which the upper side of the support is provided at the end thereof. The corresponding configurations enable a space-saving nesting arrangement of two supports for the purposes of transport.

It is further proposed that the horizontal wall of the support merges at the end thereof facing the crossbeam into a declining chamfer.

With one configuration of the crossbeam, it is proposed that the crossbeam upper side is composed of a horizontal face and an oblique face which is adjacent in the direction toward the crossbeam rear wall. Together with a corresponding configuration of the support, it is consequently possible for the chamfer which is formed on the support to meet the oblique face of the crossbeam upper side at an angle between 20° and 60° and preferably at an angle of approximately 35°. Consequently, both chamfers together form at the upper side thereof a flat V-shape. This prevents any type of tilting of the goods when displaced in the longitudinal direction of the goods support.

It is further proposed that the side walls of the support in the longitudinal direction of the support are composed of the end portion, the central portion which follows the vertical slot and another end portion at the other end of the support.

For increased capacity for resistance of the support with respect to bending loads as a result of the stored goods, it may be advantageous for the side wall on the central portion to have a greater height than on the end portion or for the side wall on the central portion to have a greater height than on the end portion and on the additional end portion at the other end of the support.

With regard to the slots which are formed in pairs on the crossbeam, it is proposed that the locking projections of the two slots are orientated toward each other. In this instance, it is additionally advantageous for there to be formed for supporting the support on the crossbeam on each locking projection a support face which is directed toward the upper side of the crossbeam and on which the edge of the respective opening is supported. Purely as a result of this measure, the load forces which are brought about by the stored goods are discharged by the support vertically on the crossbeam. A further vertical support of the support on the crossbeam is not necessary and therefore preferably also not provided.

Preferably, the crossbeam rear wall in order to form the slots is provided with punched-out portions which define the contours of the two locking projections. The portions of these contours facing each other are chamfers the largest spacing of which with respect to each other is greater than the spacing which the lower edges of the end portions have with respect to each other. As a result of this configuration, it is not necessary for the engagement of the supports to first apply a lateral pressure to the side walls of the support in order to bend them initially inwardly toward each other.

With one configuration of the crossbeam, it is proposed that it has a crossbeam front side which faces away from the crossbeam rear wall and which is integral with a wheel guide in the form of a channel-like rail. The wheel guide comprises in cross section a U-shaped profile having a horizontal portion and two portions which are adjacent thereto in a vertically upward direction, wherein the inner vertical portion is at the same time the crossbeam front side. The wheel guide is configured to receive at least one running wheel of a rack operating device, wherein it can roll along the wheel guide and is retained in the track by the vertical portions.

Preferably, the wheel guide is integral with the crossbeam and comprises the wheel guide, the crossbeam front wall and rear wall and the crossbeam upper side.

According to one variant, the support may have an edge which protrudes over the horizontal goods support and which extends longitudinally with respect to the goods support over the entire length of the support.

In order, in addition to reducing the assembly complexity, to also reduce the costs, both the crossbeams with the wheel guide and the supports are constructed in each case integrally, preferably from a bent and punched metal sheet. The metal sheet is cut out or punched out in a corresponding shape and subsequently formed by means of bending processes in such a manner that at the end of the processes the crossbeams and supports are obtained.

In the locking state, a lower edge of the support extends obliquely inward and in a downward direction. The lower edge is formed obliquely relative to the otherwise vertically extending side wall. The objective of the lower edge on the central portion is to reinforce it and to increase the load-bearing capacity.

In particular, the objective of the wall extents which are increasingly offset in the direction toward the profile center plane at the end portions is to enable simple introduction into the crossbeam slots so that a secure and clearly audible engagement of the support in the crossbeam is ensured. As a result of the stepped projection of the wall extents relative to the profile center plane, the wall portions first slide on the outer sides of the slots and subsequently along the locking projections. The inclination and the vertical extent of the wall portions is in this instance such that they form a transition of the sliding zones between the outer side of the slot and the locking projection so that the lower edge does not already become wedged on the upper side of the locking projection, but also slides along the locking projection into the correct position.

If the side wall on the central portion has a greater height than on the end portion, this has the advantage that the support can apply a greater resistance torque in the event of loading.

Other measures are explained in greater detail below with reference to preferred embodiments of the invention.

DETAILED DESCRIPTION

Figure 1:
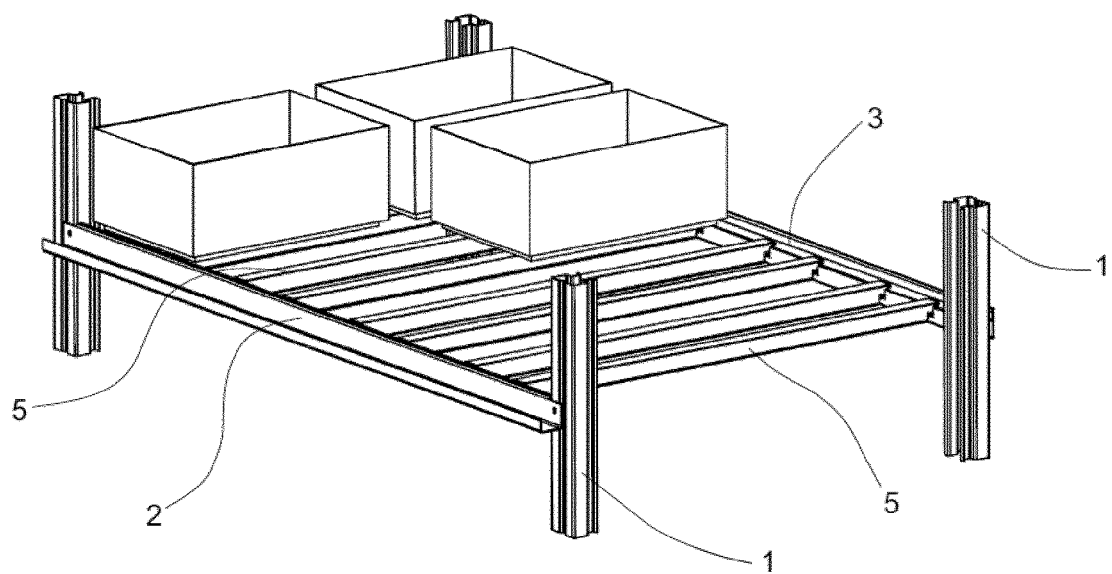
FIG. 1 shows a perspective view of the portion of a rack having vertical pillars, two crossbeams which connect the pillars and supports for storing goods between the two crossbeams.

FIG. 1 shows a plane of a multi-level rack having front and rear crossbeams 2, 3 which extend in a rack longitudinal direction. The crossbeams 2, 3 are secured by means of known securing means to corresponding vertical pillars 1 of the rack. Between the front crossbeam 2 and the rear crossbeam 3 there extend in pairs supports 5 of which the upper sides act as goods supports 10A for boxes, containers or other goods carriers as goods supports 10A (FIG. 2).

Figure 2:
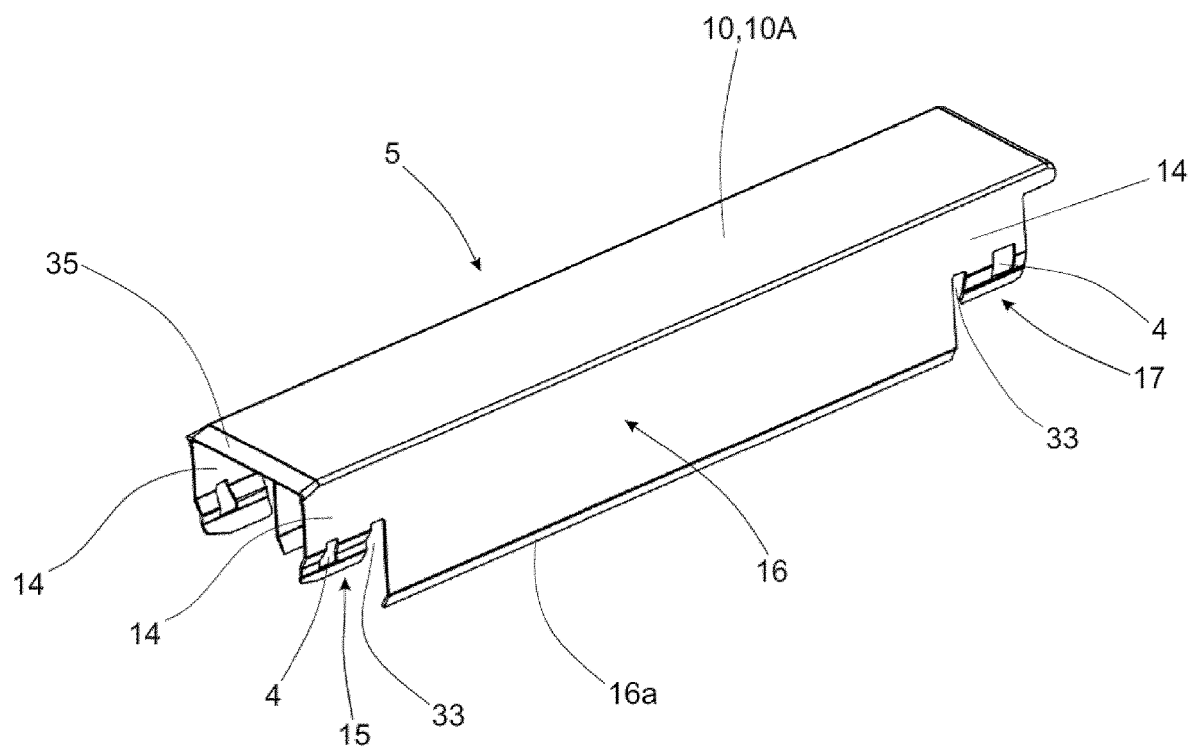
FIG. 2 shows a perspective view of a support which is configured differently at both ends thereof.
Figure 4:
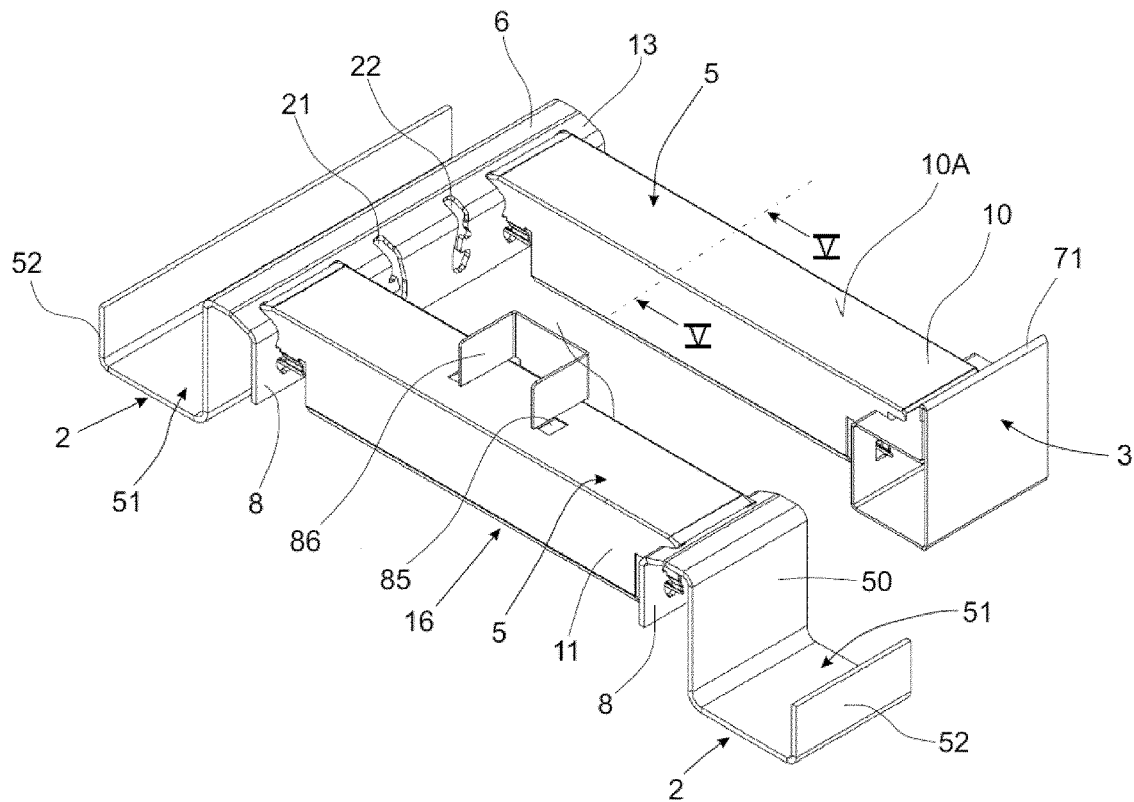
FIG. 4 shows a perspective view of two supports which are configured differently in comparison and in each case the crossbeam portions on which they are engaged.

In FIG. 1, FIG. 2 and the right-hand embodiment according to FIG. 4, there is provision for the rack to be able to be loaded and unloaded only from the front side, for which purpose the two crossbeams 2, 3 are configured differently. The crossbeam 3 which faces away from the loading side, that is, the rear crossbeam, is provided with an upright edge as a stop 71 or pushing-through limitation for the goods or load carrier. In order to ensure a reliable sliding of the goods as far as the stop 71, the horizontal wall 10 or goods support 10A is extended in the region of the rear stop 71 and reaches as far as above the upper side of the rear crossbeam 3.

Figure 3:
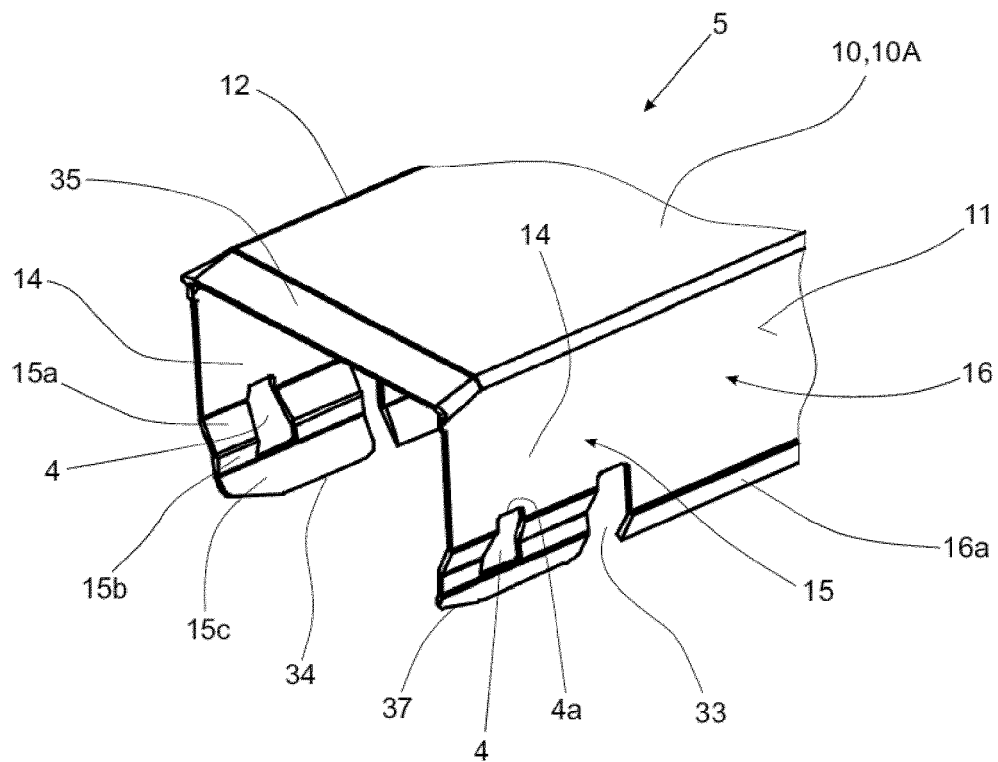
FIG. 3 shows a perspective view of only one end of a support.

FIG. 2 and FIG. 3 show the front end of the support 5 which is configured on the whole as a downwardly open, integral profile and which is composed of two substantially vertical side walls 11, 12 at both sides of a vertical profile center plane M (FIG. 5) and the horizontal wall 10 which connects the two side walls 11, 12 and the upper side of which forms the planar goods support 10A.

The support 5 has at least at the front end thereof at both sides an end portion 15 of the respective side wall 11, 12. The end portion 15 has an opening 4 and is separated by a vertical slot 33 from a long central portion 16 of the side wall 11, 12. The slot 33 extends from the lower edge 34 of the respective side wall 11, 12 only over a portion of the overall height of the side wall 11, 12, for example, over at least a third but a maximum of two thirds of the overall height of the side wall 11, 12.

Figure 5:
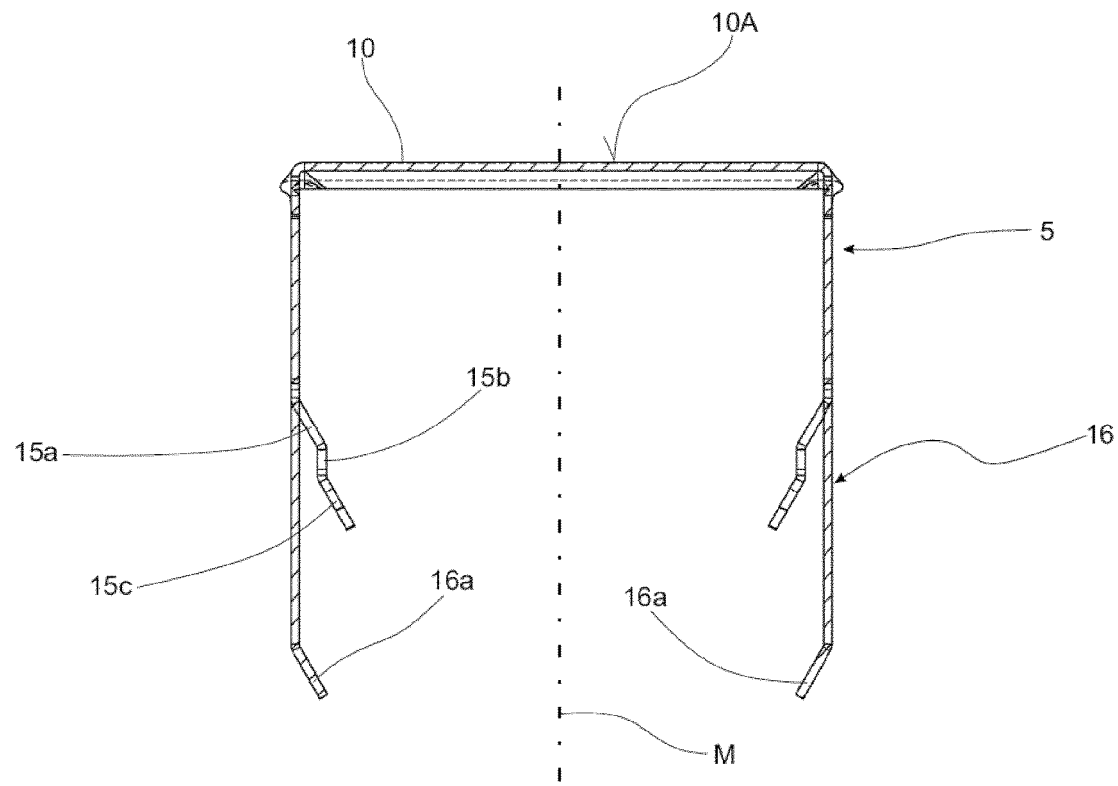
FIG. 5 shows a cross section through the crossbeam in the plane of section V-V in FIG. 4.

The paired end portions 15 of the side walls have toward the lower edge 34 thereof a wall extent which, in comparison with the wall extent when viewed at the same height of the support profile on the central portion 16 is offset in the direction toward the vertical profile center plane M (FIG. 5).

Both end portions 15 are composed, in the upper region of the profile height, of a wall portion 14 which is arranged at right-angles with respect to the horizontal wall 10 and which is arranged in the same plane as the central portion 16 and, in the lower region of the profile height, the wall extent which is offset in the direction toward the profile center plane M. In particular, this wall extent is step-like or terrace-like in that it is configured to be increasingly offset downward in the direction toward the profile center plane M.

The wall extent which is increasingly offset in a downward direction is composed of an upper oblique wall portion 15a, a central wall portion 15b and a lower oblique wall portion 15c which at the same time forms the lower edge 34 of the support profile. Preferably, the central wall portion 15b extends parallel in a manner offset with respect to the wall portion 14 and consequently also the central portion 16 of the side wall 11, 12. The transitions of the wall portions 15a, 15b are folding or bending lines.

In other words, a step-like or terrace-like configuration of the lower region of the end portions 15 is involved. In the region of the offset wall extent are the two openings 4 which are arranged in alignment with each other.

For its reinforcement, the otherwise perpendicular central portion 16 has a lower edge or wall portion 16a which extends in a bent manner obliquely with respect to the profile center plane M.

The two openings 4 are in each case square and preferably configured as an upright trapezium, having an upper edge 4a, a lower edge which is longer in comparison and inclined side edges therebetween. In this instance, the openings 4 are at least partially at the height of the upper wall portion 15a and at least partially at the height of the central wall portion 15b. The openings 4 protrude with the upper edge 4a thereof into the wall portion 4 which is located in the same plane as the extensive central portion 16.

So that the resilient lower regions of the end portions 15 behave in a flexible manner when the support 5 engages in the respective crossbeam 2, 3 and this engagement is possible with little resistance, the respective slot 33 extends upward at least to the height of the wall portion 14. A slot 33 which extends even further upward is conceivable as long as there is no weakening of the bending rigidity of the support 5.

FIGS. 2 and 3 show that the horizontal wall 10 extends in the direction toward the end thereof obliquely in a downwardly bent manner, wherein a ramp-like chamfer 35 is produced at the end of the goods support 10A. The chamfer 35 is preferably inclined at an angle of 15° with respect to the horizontal wall 10 and is produced in such a manner that it is integrally connected or remains connected to the adjacent wall portions 14. There is thus, for example, no separating slot between the side edges of the chamfer 35 and the respective wall portion 14.

In order to engage the support 5, the crossbeam rear wall 8 of the crossbeam has two slots 21, 22 which are produced by means of punching and on which a locking projection 9 is formed in each case, wherein the two locking projections 9 are orientated toward each other. After reaching the locking state illustrated on the right in FIG. 6, they engage in a positive-locking manner in the openings 4 and thus produce the positive-locking connection between the support 5 and the crossbeam 2, 3.

Figure 6:
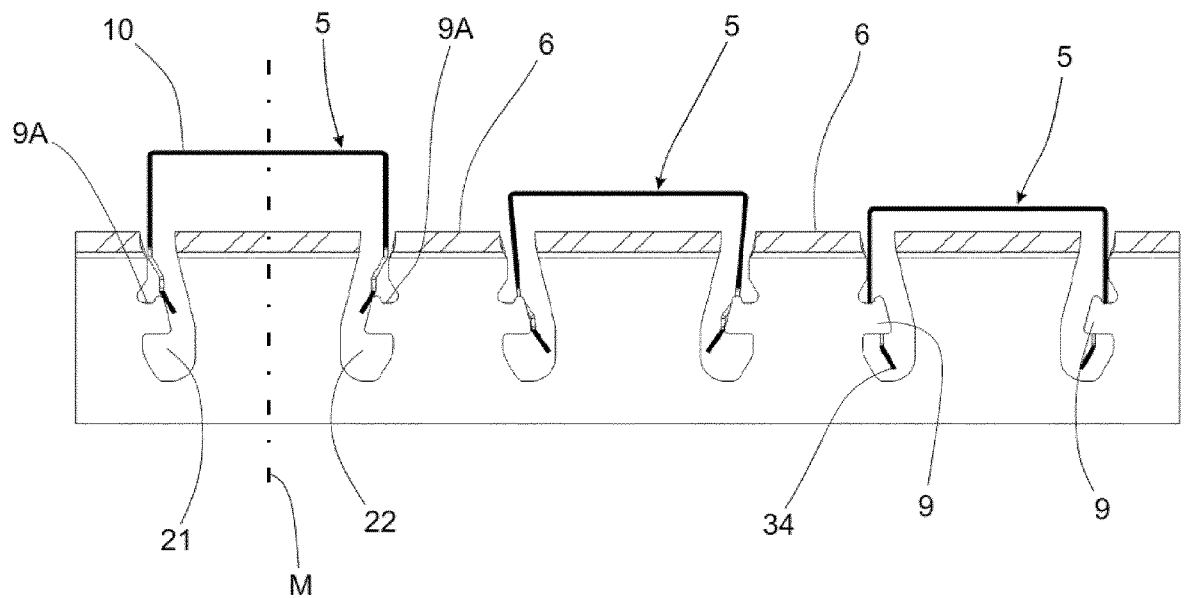
FIG. 6 shows in three stages the operation of engagement of the support which is illustrated in cross section in this instance on the front crossbeam which is depicted in a vertical longitudinal section.
Figure 6A:
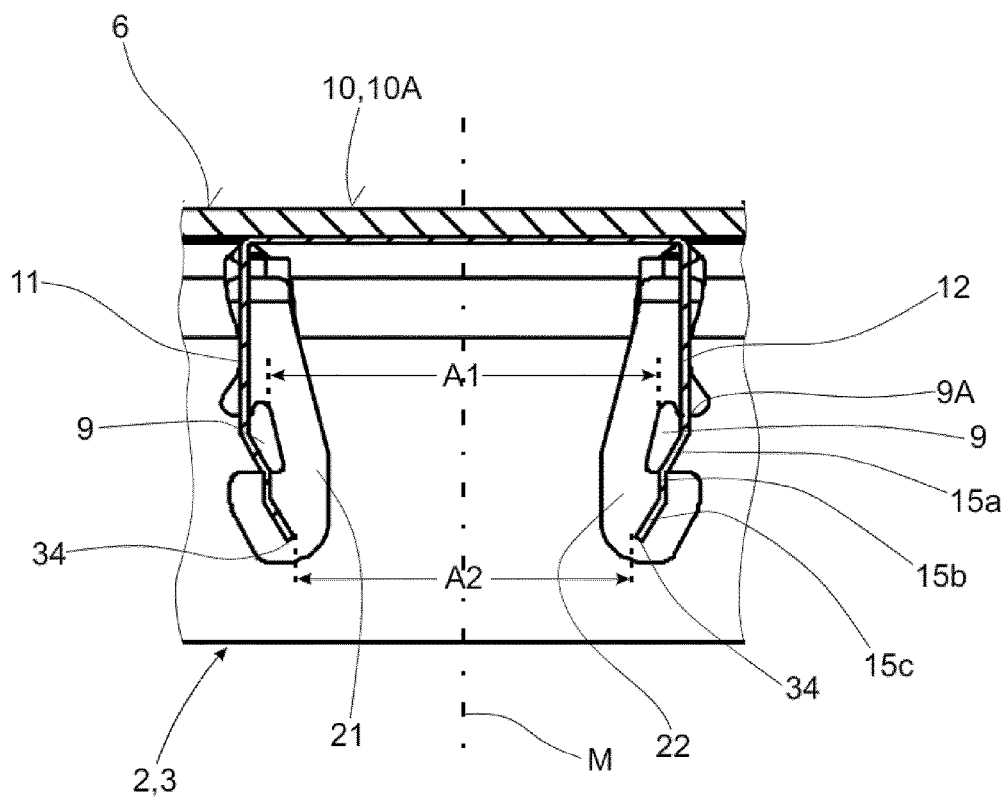
FIG. 6a shows an illustration of the locking state, comparable with the illustration which is illustrated on the right in FIG. 6.

FIG. 6 shows beside each other the various stages when the support 5 is clip-fitted onto the respective crossbeam 2 or 3. In the first stage, as a result of the pressure applied from above to the support 5, the end portions 15 are deformed inward toward each other as soon as they move into abutment with the protrusion-like locking projections 9. In the central illustration of FIG. 6, this process is already continued, the end portions 15 have moved further toward each other, wherein in this stage there is also still no positive-locking connection between the locking projection 9 and the opening 4 since the lower edge of the opening 4 still abuts in a resilient manner against the locking projection 9. Only in the third stage on the right in FIG. 6 is there a covering of the opening 4 with the protrusion-like locking projection 9 so that the end portions 15 resiliently return to their original position again, wherein the locking projection 9 is locked in a positive-locking manner in the opening 4. In this assembly state, the end portions 15 are again completely free from bending forces so that the support 5 is also on the whole, after it has been engaged on the crossbeam, free from internal pretensioning.

In order to secure the respective support 5, the crossbeam rear wall 8 has the pairs of slots 21, 22 which extend from the crossbeam upper side 6 into the crossbeam rear wall 8.

The crossbeam rear wall 8 is provided with punched-out portions in order to form the slots 21, 22. The punched-out portions also define inter alia the contours of the two locking projections 9. The mutually facing portions of these contours are configured as chamfers, the largest spacing A1 of which with respect to each other is greater than the spacing A2 which the lower edges 34 of the end portions 15 have with respect to each other.

The upper sides of the locking projections 9 are in the form of support faces 9A in order, together with the upper edge 4a of the opening 4, to receive the load of the goods which are supported on the supports 5. In contrast, according to FIG. 6, the lower edge 34, which extends obliquely downward, of each side wall 11, 12 has no touching contact with the edge of the respective slot 21, 22.

According to FIG. 4, the crossbeam 2 may have at the outer side thereof a crossbeam front side 50 which is connected in one piece to a wheel guide 51 in the form of a rail or is a component thereof. The rail comprises a horizontal portion 51 which is adjacent to the crossbeam front side 50, preferably supplemented by a vertical portion 52 which is adjacent thereto and which extends parallel with the crossbeam front side 50. The horizontal portion 51 provides the rolling face for a corresponding running wheel of a rack operating device or shuttle which is not illustrated. The vertical portion 52 and the vertical crossbeam front side 50 may form the lateral guide delimitations for the running wheel, wherein, however, a guide may also possibly be sufficient without the vertical portion 52.

Furthermore, the crossbeam upper side 6 has an oblique face 13 in the direction toward the crossbeam rear wall 8, wherein this oblique face 13 together with the chamfer 35 formed on the support 5 forms a flat V-shape in the engaged state of the support. This prevents any type of tilting of the goods during longitudinal displacement along the goods support 10A.

The slots 33 which at least partially separate the end portions 15, 17 from the long central portion 16 afford the advantage that during assembly at most some pressure has to be applied in the region of the recessed wall portions 15a, 15b, 15c, and no pressure to the two side walls 11, 12 overall. However, not even such a local pressure is required since, as a result of the specific configuration of the end portions 15, 17, a slight pressure from above on the horizontal wall 10 is already sufficient to engage the relevant end of the support 5 in a secure and permanent manner with the respective crossbeam 2 or 3. The required assembly force is significantly reduced.

Figure 7:
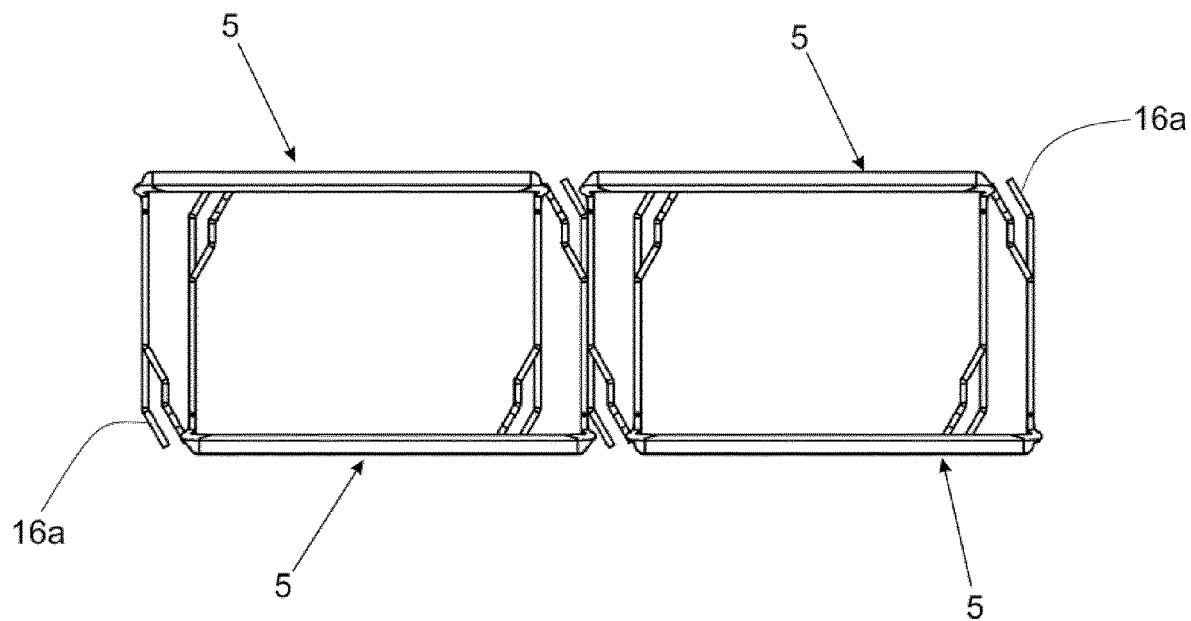
FIG. 7 shows a cross section through a total of four supports which are stacked in pairs one inside the other.
Figure 8:
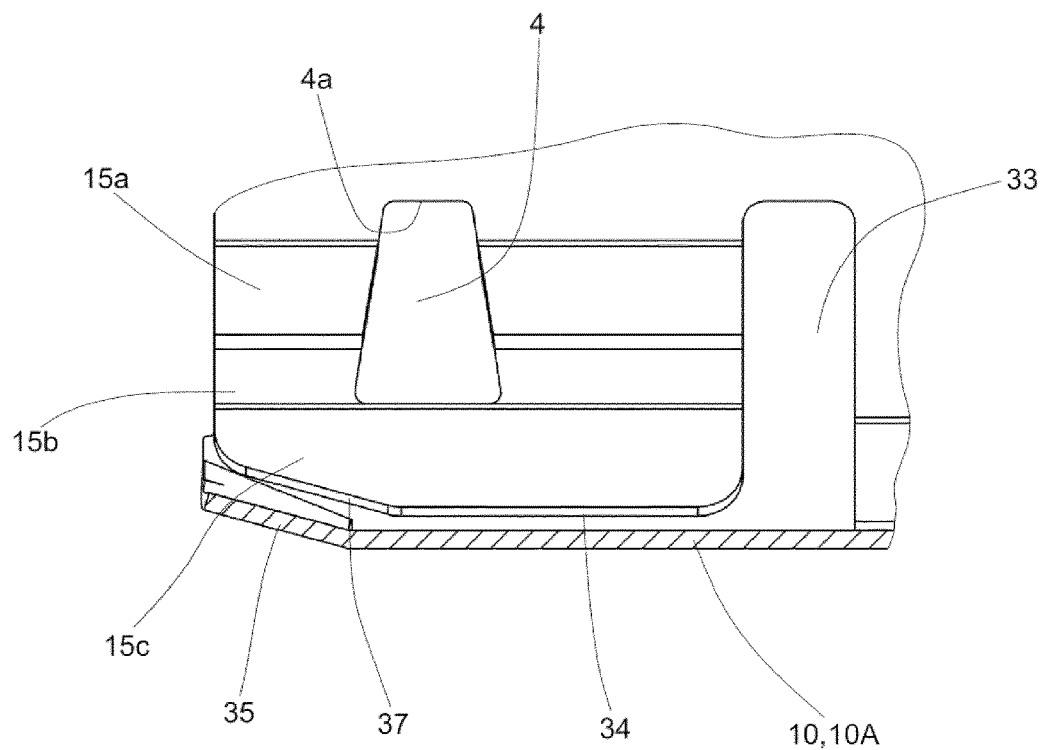
FIG. 8 shows a longitudinal section through a pair of supports which are placed one inside the other.

According to FIGS. 7 and 8, for the transport of the supports 5 to the construction location, it is advantageous for two supports to be inserted one into the other in each case. The supports 5 described here can be inserted one into the other in pairs, wherein the profile openings thereof are directed toward each other. However, the ramp-like chamfer 35 which is formed on one support prevents two supports 5 from being placed too tightly on each other. In order in this instance to again save a few millimeters of structural height with supports 5 which are laid one in the other in pairs, on the end portion 15 the lower edge 34 is configured in such a manner that, starting from the vertical slot 33, it initially extends horizontally and then as an obliquely rising edge 37. The obliquely rising edge 37 corresponds virtually precisely to the chamfer 35 on the other of the two supports 5.

Figure 9:
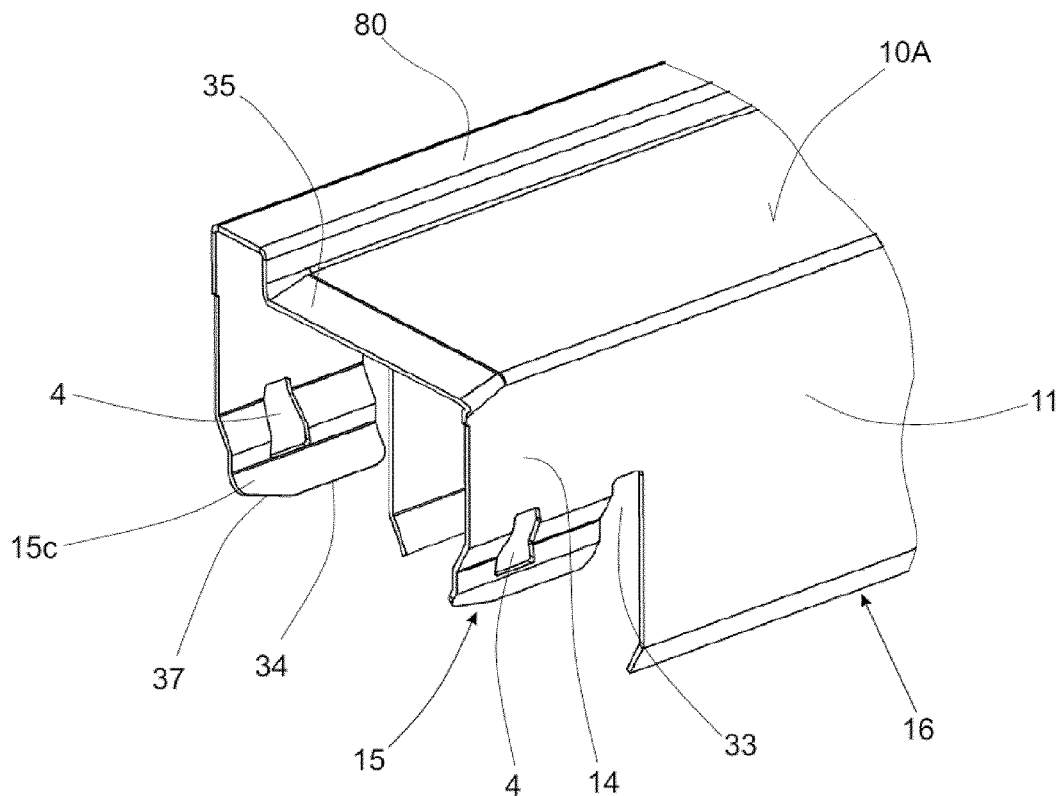
FIG. 9 shows a perspective view of only one end of a support, in this instance in a third embodiment of the support.

FIG. 9 shows a variant of the support 5, in which the upper side of the support 5 in addition to the horizontal goods support 10A has an upwardly projecting edge 80 which extends along the goods support 10A over the entire length of the support. As a result of the edge 80, the goods which are supported on the goods support 10A are prevented from being able to slide laterally. This structural type of the support 5 is also used in pairs, wherein the edge 80 is located on the left on one support of the support pair and on the right on the other support of the support pair. The clip-fitting of this support 5 is carried out in the same manner as described above in relation to the other embodiments. In addition, in this embodiment, the chamfer 35 is also formed at the end of the goods support 10A.

If the support is provided for racks in which the storage and removal can be carried out from both sides, the securing of a push-through protection is advantageous, for example, in the center of the length of the goods support 10A. FIG. 4 shows in the embodiment illustrated on the left such a push-through protection 86 for the securing of which to the horizontal wall 10 a securing structure 85 is formed, for example, an opening in the horizontal wall 10.

FIGS. 2, 4 and 5 show by way of example that the height of the side wall 11, 12 of the support 5 on the central portion 16 may have a greater height than on the front end portion 15 and/or on the rear end portion 17. In contrast, in FIG. 3, these heights are substantially identical.

The greater height on the central portion 16 leads to an increased resistance force of the support 5 so that relatively heavy load carriers can also be stored in the rack.

LIST OF REFERENCE NUMERALS

Pillar 1
Front crossbeam 2
Rear crossbeam 3
Opening 4
Upper edge 4a
Support 5
Crossbeam upper side 6
Crossbeam rear wall 8
Locking projection 9
Support face 9A
Horizontal wall 10
Goods support 10A
Side wall 11, 12
Oblique face 13
Wall portion 14
End portion 15
Upper wall portion 15a
Central wall portion 15b
Lower wall portion 15c
Central portion 16
Lower wall portion 16a
End portion 17
Slot 21, 22
Slot 33
Lower edge 34
Chamfer 35
Rising edge 37
Crossbeam front side 50
Horizontal portion 51
Vertical portion 52
Stop 71
Edge 80
Securing structure 85
Push-through protection 86
Spacing A1
Spacing A2
Profile center plane

The invention claimed is:

1. A rack for storing goods, comprising:
two crossbeams (2, 3) which are arranged parallel with each other; and
supports (5) which extend between the crossbeams (2, 3) and are supported on the crossbeams (2, 3),
wherein the supports (5) are downwardly open profiles and are each composed of
a first side wall (11) on one side of a vertical profile center plane (M),
a second side wall (12) on another side of the vertical profile center plane (M), and
a horizontal wall (10) which connects the first side wall (11) and the second side wall (12),
wherein an upper side of the horizontal wall (10) forms a goods support (10A),
wherein at least one of the crossbeams has
a crossbeam upper side (6),
a crossbeam rear wall (8), and
two slots (21, 22) for securing one of the supports (5),
wherein the two slots (21, 22) extend from the crossbeam upper side (6) into the crossbeam rear wall (8) and each have a locking projection (9),
wherein the locking projection (9), in a locking state, engages in a positive-locking manner in an opening (4) in the respective side wall (11, 12),
wherein the opening (4) is located in an end portion (15) of the respective side wall (11, 12),
wherein the end portion (15) is short in comparison with a central portion (16) which forms a majority length of the respective side wall (11, 12),
wherein the end portion (15) is separated from the central portion (16) by a slot (33) which extends from a lower edge (34) of the respective side wall (11, 12) only over a portion of a height of the side wall (11, 12) and
wherein the end portion (15) has in a direction toward the lower edge (34) thereof a wall extent which in comparison with a wall extent of the central portion (16) is offset in a direction toward the profile center plane (M).

2. The rack as claimed in claim 1,
wherein the wall extent of the end portion (15) is increasingly offset further in a downward direction in the direction toward the profile center plane (M).

3. The rack as claimed in claim 1,
wherein the end portion (15) comprises
a wall portion (14) which is arranged at a right-angle with respect to the horizontal wall (10) and which is in alignment with the central portion (16) and
the offset wall extent.

4. The rack as claimed in claim 3,
wherein the slot (33) extends as far as a height of the wall portion (14) which is in alignment with the central portion (16).

5. The rack as claimed in claim 3,
wherein the opening (4) is mostly located in the wall extent which is offset in the direction toward the profile center plane (M) and extends upward into the wall portion (14) which is in alignment with the central portion (16).

6. The rack as claimed in claim 1,
wherein the offset wall extent is composed of a sequence of wall portions (15a, 15b, 15c) which are arranged one above the other and which merge into each other along folding or bending lines.

7. The rack as claimed in claim 6,
wherein the opening (4) extends at least over an entire height of an uppermost wall portion (15a) of the wall portions (15a, 15b, 15c) which are arranged one above the other.

8. The rack as claimed in claim 1,
wherein on the end portion (15) the lower edge (34), starting from the slot (33), initially extends horizontally and then as an obliquely rising edge (37).

9. The rack as claimed in claim 1,
wherein the horizontal wall (10) of the support (5) merges at the end thereof facing the crossbeam (2,3) into a declining chamfer (35).

10. The rack as claimed in claim 9,
wherein the crossbeam upper side (6) is composed of a horizontal face and an oblique face (13) which is adjacent in the direction toward the crossbeam rear wall (8).

11. The rack as claimed in claim 10,
wherein the chamfer (35) which is formed on the support (5) meets the oblique face (13) which is formed on the crossbeam upper side (6) at an angle between 20° and 60°.

12. The rack as claimed in claim 1,
wherein the side walls (11, 12) in a longitudinal direction of the supports (5) are composed of
the end portion (15),
the central portion (16) which follows the slot (33), and
an additional end portion (17) at another end of the support (5).

13. The rack as claimed in claim 1,
wherein the side wall (11, 12) of the central portion (16) has a greater height than of the end portion (15).

14. The rack as claimed in claim 12,
wherein the side wall (11, 12) of the central portion (16) has a greater height than of the end portion (15) and of the additional end portion (17).

15. The rack as claimed in claim 1,
wherein the locking projections (9) of the two slots (21, 22) are orientated toward each other.

16. The rack as claimed in claim 15,
wherein for supporting the support (5) on the crossbeam (2, 3) on each locking projection (9) there is formed a support face (9A) which is directed toward the crossbeam upper side (6) and on which the edge (4a) of the respective opening (4) is supported.

17. The rack as claimed in claim 15,
wherein the crossbeam rear wall (8) in order to form the slots (21, 22) is provided with punched-out portions, which define contours of the two locking projections (9) and
wherein mutually facing portions of the contours are chamfers, a largest spacing (A1) of which with respect to each other is greater than a spacing (A2) which the lower edges (34) of the end portions (15) have with respect to each other.

18. The rack as claimed in claim 1,
wherein the crossbeam (2) has a crossbeam front side (50) which is integral with a wheel guide (51) in the form of a channel-like rail.

19. The rack as claimed in claim 1,
wherein the support (5) has an edge (80) which protrudes over the horizontal goods support (10A) and which extends longitudinally with respect to the goods support (10A) over an entire length of the support (5).

* * * * *